(No Model.)
H. UNDERWOOD & C. SCHWEIZER.
SPLIT PULLEY.
No. 327,206. Patented Sept. 29, 1885.
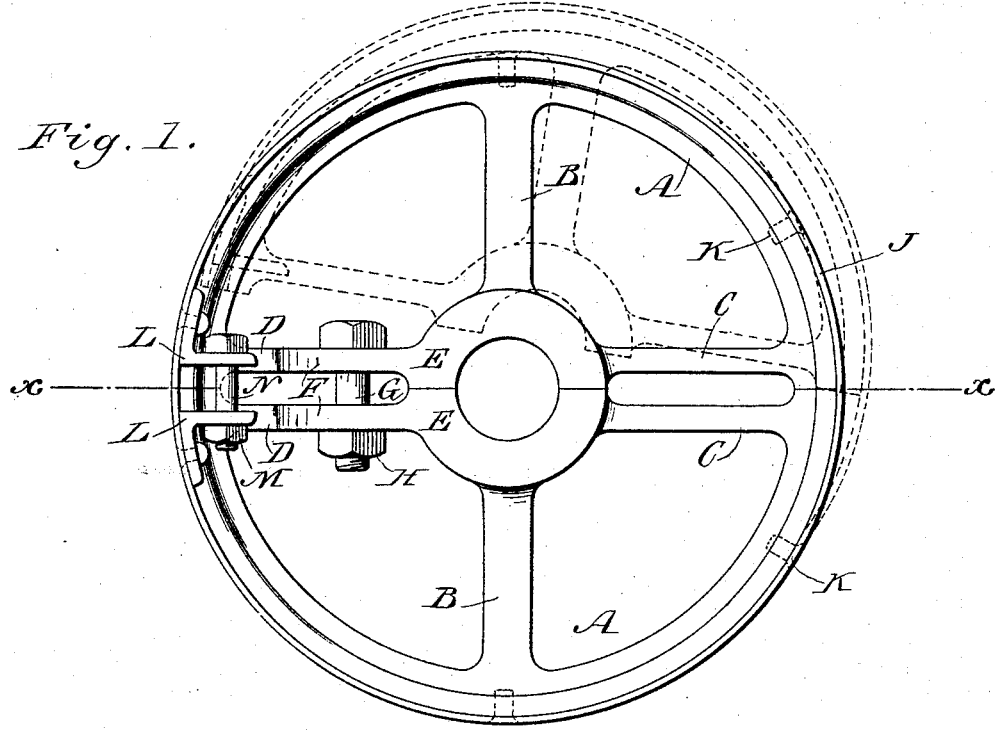
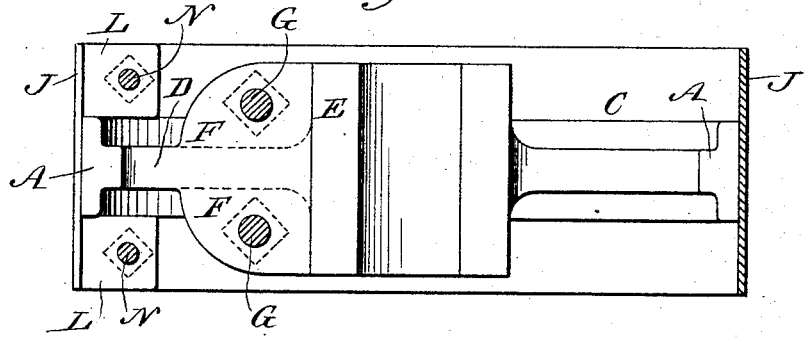
WITNESSES:
INVENTOR:
H. Underwood
C. Schweizer
BY Munn & Co
ATTORNEYS.

UNITED STATES PATENT OFFICE.

HARRISON UNDERWOOD AND CHARLES SCHWEIZER, OF NEW YORK, N. Y.

SPLIT PULLEY.

SPECIFICATION forming part of Letters Patent No. 327,206, dated September 29, 1885.

Application filed May 11, 1885. (No model.)

*To all whom it may concern:*

Be it known that we, HARRISON UNDERWOOD and CHARLES SCHWEIZER, both of New York, in the county of New York and State of New York, have invented a new and Improved Split Pulley, of which the following is a full, clear, and exact description.

The object of our invention is to provide a new and improved split pulley which can be placed on the shaft very easily and can be locked firmly on the same.

The invention consists in the combination, with two half pulley-sections, of a split rim or band secured to and surrounding the sections, and of bolts for clamping the half-sections on the shaft and for holding the ends of the band together.

Reference is to be had to the accompanying drawings, forming a part of this specification, in which similar letters of reference indicate corresponding parts in both the figures.

Figure 1 is a side view of our improved split pulley. Fig. 2 is a sectional plan view of the same on the line $x$ $v$, Fig. 1.

The pulley is composed of two semicircular halves, each composed of a semicircular rim part, A, each having three spokes, B, C, and D, and a half-hub, E.

The spokes D have two opposite laterally-projecting lugs or wings, F, each provided with an aperture, through which bolts G, having nuts H, are passed.

A spring split band or rim, J, which is wider than the rim parts A, is held to the rim of the ring-sections A by rivets K, and at each end it is provided on the inner surface with an angle-piece, L, which is riveted on. To place the pulley on the shaft, the two sections are swung from each other, the band J serving as a hinge, and the shaft is passed into the hub parts, and the two pulley-sections are swung together and the nuts H are drawn up tight to clamp the hub parts E on the shaft.

Bolts N, having nuts M, are passed through the angle-pieces L, and the nuts M are drawn up tight.

As the band J serves as a hinge, the sections can easily be swung from each other to permit of passing the shaft between them, and the pulley can be clamped securely on the shaft by means of the bolts.

Having thus fully described our invention, we claim as new and desire to secure by Letters Patent—

1. In a split pulley, the combination, with two half-sections, of a split band surrounding them and secured to each section, substantially as herein shown and described.

2. In a split pulley, the combination, with two half-sections, of a split band surrounding the rims of the sections and secured to the same, angle-pieces on the ends of the band, and bolts passed through the said angle-pieces, substantially as herein shown and described.

3. A split pulley formed of two pulley-sections secured to a split band serving as a hinge, which permits of swinging the sections from each other, substantially as herein shown and described.

4. In a split pulley, the combination, with two half-sections having lugs or wings on the spokes, of bolts passed through the said lugs, a split band surrounding the pulley-sections, angle-pieces secured on the ends of the band, and bolts passed through the angle-pieces, substantially as herein shown and described.

HARRISON UNDERWOOD.
CHARLES SCHWEIZER.

Witnesses:
OSCAR F. GUNZ,
C. SEDGWICK.